(12) United States Patent
Hara et al.

(10) Patent No.: US 6,753,113 B2
(45) Date of Patent: Jun. 22, 2004

(54) SOLID ELECTROLYTE CELL

(75) Inventors: Tomitaro Hara, Miyagi (JP); Mashio Shibuya, Miyagi (JP); Yusuke Suzuki, Miyagi (JP)

(73) Assignee: Sony Corporation, Tokyo (JP)

( * ) Notice: Subject to any disclaimer, the term of this patent is extended or adjusted under 35 U.S.C. 154(b) by 271 days.

(21) Appl. No.: 09/803,561

(22) Filed: Mar. 9, 2001

(65) Prior Publication Data

US 2002/0015885 A1 Feb. 7, 2002

(30) Foreign Application Priority Data

Mar. 10, 2000 (JP) .................................... P2000-072512

(51) Int. Cl.⁷ .......................... H01M 6/18; H01M 6/24
(52) U.S. Cl. ..................... 429/306; 429/324; 429/304; 429/94
(58) Field of Search .................... 429/94, 142, 144, 429/304, 306, 324, 212, 217; 252/62.2

(56) References Cited

U.S. PATENT DOCUMENTS

| 4,184,013 A | | 1/1980 | Fischer et al. | |
| 5,658,687 A | * | 8/1997 | Takeda et al. | 429/317 |
| 6,248,479 B1 | * | 6/2001 | Takeda et al. | 429/300 |

FOREIGN PATENT DOCUMENTS

| CA | 2215849 A | | 3/1999 |
| JP | 04249870 A | | 9/1992 |
| JP | 04332479 A | | 11/1992 |
| JP | 09035746 A | | 2/1997 |
| JP | 09-035746 | * | 2/1997 |

OTHER PUBLICATIONS

Linden. Handbook of Batteries, 2nd ed., pp. 36.1–36.3; 36.13–36.16. 1995 (no month).*

* cited by examiner

Primary Examiner—Patrick Ryan
Assistant Examiner—Tracy Dove
(74) Attorney, Agent, or Firm—Sonnenschein, Nath & Rosnethal LLP (57) ABSTRACT

A solid electrolyte cell in which oxidative decomposition of electrolyte components is suppressed to maintain the superior cell performance. The solid electrolyte includes a negative electrode 9 having a negative electrode current collector 7 and a negative electrode active material 8, a positive electrode 12 having a positive electrode current collector 10 and a positive electrode active material 11 and a solid electrolyte 13 arranged between the negative electrode 9 and the positive electrode 12 and which is comprised of an electrolyte salt dispersed in a matrix polymer. A diene compound is contained in at least one of the positive electrode 12 and the solid electrolyte 13.

10 Claims, 4 Drawing Sheets

SOLID ELECTROLYTE CELL

RELATED APPLICATION DATA

The present application claims priority to Japanese Application No. P2000-059848 filed Mar. 6, 2000, which application is incorporated herein by reference to the extent permitted by law.

BACKGROUND OF THE INVENTION

This invention relates to a solid electrolyte cell having a solid electrolyte.

In keeping up with the recent tendency to reduction in size and weight and popularity of portable type versions of an electronic equipment, such as a camera built-in Video T ape Recorder or a mobile information terminal, further size reduction with a higher energy density is demanded of a secondary cell as a power supply source for these electronic equipment.

The secondary cells for general use may be enumerated by an aqueous solution type lead accumulators or nickel-cadmium cells, and non-aqueous electrolyte solution cells. However, since these secondary cells use a liquid as an electrolyte, there is a risk of leakage of the internal solution which possibly affects ambient electronic parts. With this in mind, a solid electrolyte, that is an electronic solution in a solidified form, has been proposed.

In particular, a gelated solid electrolyte, obtained on impregnating a matrix polymer with a non-aqueous solvent, referred to below as a gel electrolyte, is now being researched briskly because its electrolytic solution phase represents a main path for the ion conduction and hence high-level ion conductivity corresponding to that of the electrolytic solution is felt to be promising The non-aqueous electrolyte solution secondary cell, employing the gel electrolyte, is constructed as follows: A positive electrode active material, comprising e.g., $LiCoO_2$ and graphite, is layered on a positive electrode current collector comprised of a thin aluminum sheet, to form a positive electrode. On the other hand, a negative electrode active material comprising e.g., carbon, coke or graphite, is formed on a positive electrode current collector comprised of a thin copper sheet, to form a negative electrode. A separator formed as a fine porous film of e.g., polypropylene or polyethylene is sandwiched between the negative and positive electrodes, while a gel electrolyte is charged into a space between the negative and positive electrodes and the separator to complete a element cell as a sandwiched structure. This element cell is hermetically sealed and accommodated in the interior of a sealing material comprised of a thin metal film, such as an aluminum foil, and plastic films, such as nylon, polyethylene, polypropylene and polyethylene terephthalate.

The non-aqueous solvent, used in the above-described non-aqueous electrolyte solution secondary cells, may be enumerated by, for example, carbonates or esters, such as ethylene carbonate, propylene carbonate, diethyl carbonate, a-butyrolactone. These solvents are known to undergo deterioration in cell characteristics on repeated charging/discharging with the charging voltage exceeding 4V or on prolonged storage in charged state, as disclosed in Japanese Laying-Open Patent Publication Nos. H-4-332479 and H-337247. This deterioration in characteristics is appreciably ascribable to oxidative decomposition of the non-aqueous solvent under elevated voltage. Thus, for improving the performance of the high-capacity non-aqueous electrolyte solution cell of the order of 4V, it is imperative to improve characteristics of the non-aqueous solvent. Moreover, in a solid electrolyte cell employing the solid electrolyte as the electrolyte, measures for preventing oxidative decomposition of solid electrolyte components are felt to be desirable.

For preventing deterioration of cell characteristics due to oxidative decomposition of solid electrolyte components as described above, there has been proposed a cell containing a toluene component, as disclosed in e.g., the Japanese Laying-Open Patent Publication H-4-249870. There has also been proposed a method for adding a compoind coordinated in stability with respect to lithium ons, in order to prevent decomposition of the non-aqueous solvent on the surface of the negative electrode of carbon, as disclosed in the Japanese Laying-Open Patent Publication H-9-35746.

However, the above-described methods are insuffcient as means for preventing the cell performance from being deteriorated due to oxidative decomposition of solid electrolyte components, such that the cell performance is deteriorated with repetition of the charging/discharging cycles,

SUMMARY OF THE INVENTION

It is therefore an object of the present invention to provide a solid electrolyte cell in which oxidative decomposition of solid electrolyte components may be suppressed to maintain superior cell performance.

According to the present invention, there is provided a solid electrolyte cell including a positive electrode having a positive electrode current collector and a positive electrode active material, a negative electrode having a negative electrode current collector and a negative electrode active material, and a solid electrolyte comprised of an electrolyte salt dispersed in a matrix polymer. The solid electrolyte is arranged between the positive electrode and the negative electrode, and a diene compound is contained in at least one of the positive electrode, negative electrode and the solid electrolyte.

According to the present invention, as described above, a diene compound is contained in at least one of the positive electrode, negative electrode and the solid electrolyte to capture active oxygen to prevent oxidative decomposition of the electrolyte components. So, it is possible to suppress deterioration of the cell performance ascribable to oxidation of the electrolyte components to maintain superior cell performance.

DESCRIPTION OF THE PREFERRED EMBODIMENTS

Referring to the drawings, preferred embodiments of a solid electrolyte cell according to the present invention will be explained in detail.

Figure 1:
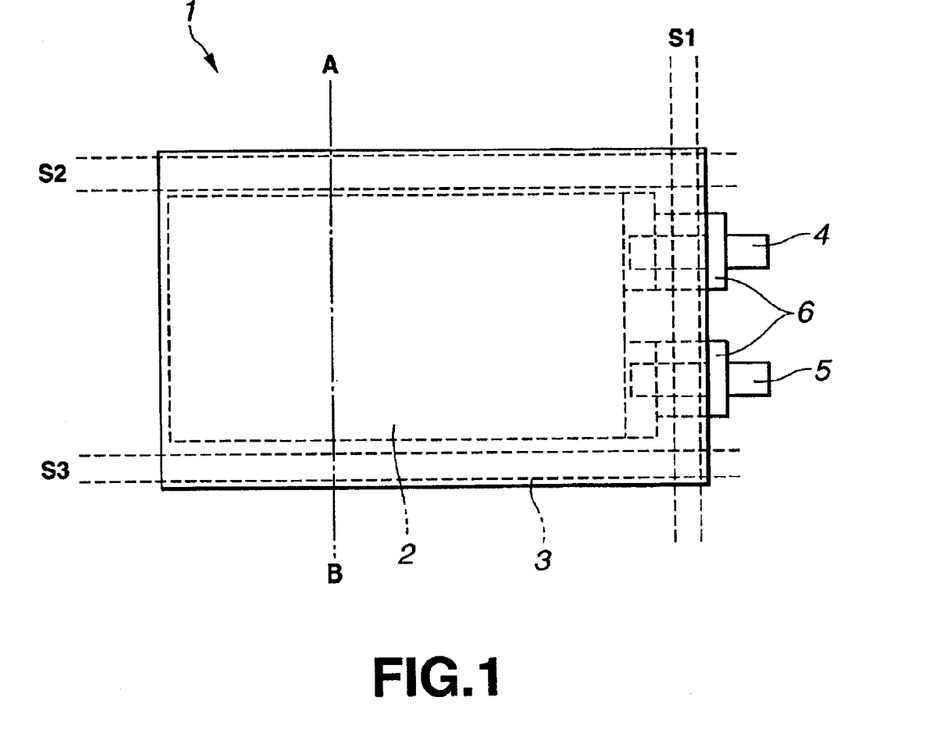
FIG. 1 is a plan view showing an illustrative structure of a solid electrolyte cell according to the present invention.

FIG. 1 shows an illustrative structure of a solid electrolyte cell embodying the present invention. The solid electrolyte cell 1 includes an element cell 2, an exterior film 3 for sealing the element cell 2 therein by being sealed with sealants S1 to S3, positive electrode lead 4 having one end led out from the exterior film 3, a negative electrode lead 5 having one end led out from the exterior film 3, and a resin film 6 sheathing the negative electrode lead 5 and the positive electrode lead 4 at the sealant S1 of the exterior film 3 for improving the hermetic sealing performance of the exterior film 3.

Figure 2:
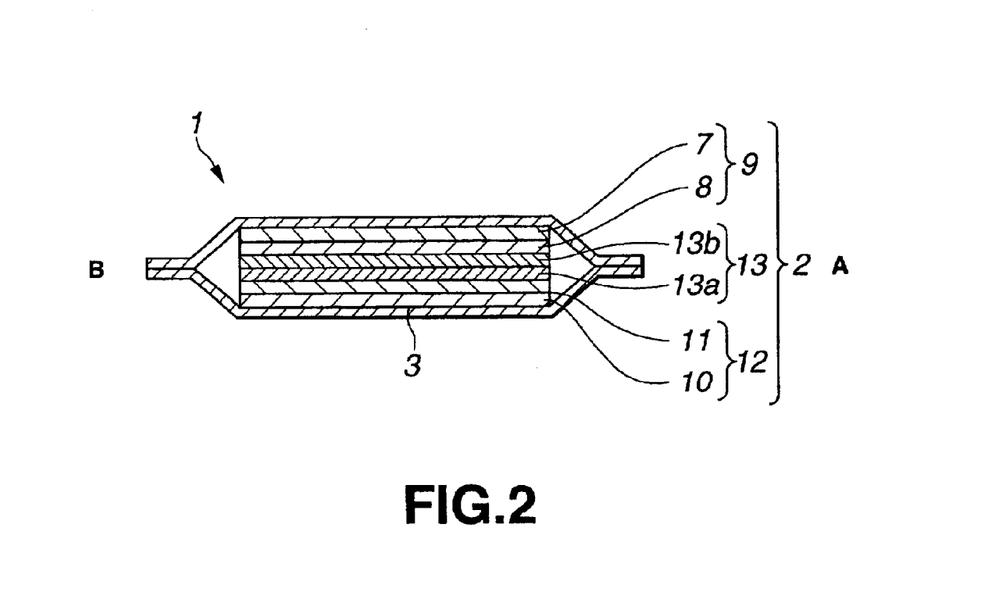
FIG. 2 is a cross-sectional view of the solid electrolyte cell taken along line A-B of FIG. 1.

The element cell 2 is constructed by layering a negative electrode 9, having a negative electrode current collector 7 and a layer of a negative electrode active material 8, and a positive electrode 12, having a positive electrode current collector 10 and a layer of a positive electrode active material 11, as shown in FIG. 2. The positive electrode lead 4 and the negative electrode lead 5 are connected to the positive electrode 12 and to the negative electrode 9, respectively.

In the solid electrolyte cell, according to the present invention, diene compounds, having the function of capturing active hydrogen, are contained in at least one of the positive electrode active material 11, negative electrode active material 8 and the solid electrolyte layer 13.

If the solid electrolyte cell 1 is in the charged state, such that active hydrogen is yielded from the positive electrode 12, active oxygen is captured by the diene compound, thus suppressing the oxidative decomposition of the electrolyte components by the active oxygen. Thus, by having the diene compound in at least one of the layer of a positive electrode active material 11 and the solid electrolyte layer 13, it becomes possibe to prevent the cell performance from being deteriorated due to oxidative decomposition of the electrolyte components.

If, in particular, 1,4-cyclohexadiene is used as the diene compound, the meritorious effect of suppressing the deterioration of the cell performance due to oxidative decomposition of the electrolyte components is achieved. As these diene compounds, use may be made of 1,1,4,4-tetraphenyl-1,3-butadiene, 1,4-hexadiene, 1,4-cyclohexadiene, 1,5-cyclooctadiene, 1,5-hexadiene, 1, (9-anthracenyl)-4-phenyl-1,3-butadiene, 2,4-hexadiene, 2,5-dimethyl-2,4-hexadiene, 6-acetoxy dicyclopentadiene or diepentene, may be used.

The content of the aforementioned diene compound, which may differ with the site in the cell inside in which the compound is contained. If the compound is contained in the solid electrolyte layer 13, it is contained per 1 g of the positive electrode active material forming the positive electrode 12 preferably in a range of 0.0001 mol to 0.0005 mol and more preferably in an amount of 0.0003 mol to 0.0005 mol. If the content of the diene compound per 1 g of the positive electrode active material exceeds 0.0005 mol, there is a risk that the diene compounds undergo a polymerization reaction or that a gas is by-produced. On the other hand, if the content of the diene compound per 1 g of the positive electrode active material is less than 0.0005 mol, it may be an occurrence that sufficient effect in suppressing oxidative deterioration of the electrolyte component cannot be achieved. If the content of the diene compound per 1 g of the positive electrode active material ranges between 0.0001 mol and 0.0005 mol, the content of the diene compound, calculated in terms of the quantity of the non-aqueous electrolytic solution used in a routine lithium ion secondary cell, ranges between approximately 1 to approximately 5 vol %.

In light of the reaction mechanism, the aforementioned diene compound is preferably contained in the solid electrolyte layer 13. In particular, for an operation of the utmost efficiency, the diene compound may be contained in a site proximate to the positive electrode 12 where active oxygen is most likely to be produced. Specifically, if the solid electrolyte layer 13 is made up of a first solid electrolyte layer 13a formed on the side positive electrode and a second solid electrolyte layer 13b formed on the side negative electrode, preferably 75% or more and more preferably 80% or more to 95% or less of the total content of the diene compound is contained in the first solid electrolyte layer 13a, as shown in FIG. 2. If the proper amount of the diene compound is captured in the first solid electrolyte layer 13a, active oxygen produced from the positive electrode 12 is promptly captured by the diene compound to suppress the oxidative decomposition of the electrolyte component efficiently. If conversely the content of the diene compound in the first solid electrolyte layer 13a is less than 75% of the total content of the compound, the positive electrode 12 where active oxygen is yielded is spaced significantly from the site where the majority of the diene compound is located, such that the yielded active oxygen cannot be captured reliably.

The thickness of the first solid electrolyte layer 13a is preferably not more than 10 μm. If the thickness of the first solid electrolyte layer 13a is not more than 10 μm, the major portion of the diene compound can be located in the vicinity of the positive electrode 12. On the other hand, if the thickness of the first solid electrolyte layer 13a exceeds 10 m, the diene compound in the first solid electrolyte layer 13a is diluted in concentration, even if the aforementioned optimum amount of the diene compound is contained in the first solid electrolyte layer 13a. The result is that the effect of capturing the yielded active oxygen is possibly weakened to deteriorate the cell performance.

The positive electrode 12 has a layer of a positive electrode active material 11, containing a positive electrode active material, formed on the positive electrode current collector 10. This positive electrode current collector 10 may, for example, be a metal foil, such as an aluminum foil.

In constructing a lithium ion secondary cell, for example, there is no particular limitation to the material of the positive electrode active material, provided that it is capable of occluding or emitting lithium ions or anions. It is however desirable that the material has an oxidation potential with respect to lithium of not less than 2.5 V. These materials may be a lithium-containing transition metal oxide, such as lithium cobaltate, lithium nickelate or lithium spinel manganate. This compound lithium oxide may be used alone, or plural compound lithium oxides may be used in combination. The positive electrode active material used may be transition metal chalcogens, such as molybdenum sulfide or titanum sulfide, hetero atom covalent based high molecular compound, such as poly aniline or polypyrrole, or covalent high molecular compounds, such as polydiacetylene or polyphenylene vinylene.

The negative electrode 9 includes a negative electrode active material 8, containing a negative electrode active material, deposited on the negative electrode current collector 7. This negative electrode current collector may, for example, be a metal foil, such as copper foil.

As the negative electrode active material, such a material that is able to dope or undope lithium may be used. Such material that is able to dope or undope lithium may be metal lithium, its alloys or carbon materials. The carbon materials may be enumerated by natural graphite, artificial graphite, pyrocarbons, cokes, carbon blacks, such as acetylene black, vitreous carbon, activated carbon, carbon fibers, sintered organic high-molecular material, sintered coffee beans, sintered cellulose and sintered bamboo.

As the solid electrolyte layer 13, a high-molecular solid electrolyte having adhesive properties and properties as a diaphragm, or a gel electrolyte comprising this high-molecular solid electrolyte and a plasticizer, as an additive, may be used.

For example, the high-molecular solid electrolyte comprises an electrolyte salt dispersed in a matrix polymer.

The electrolyte salt may be $LiPF_6$, $LiClO4$, $LiCF_3SO_3$, $LiCF_3SO_3$, $LiAsF_6$, $LiBF_4$, $LiN(CF_3SO_3)_2$, $C_4F_9SO_3Li$, $LiC(CF_3SO_2)_3$, LiF, or LiBr, used either alone or as a mixture. Of these, $LiPF_6$ is preferably used in view of its ion conductivity.

There is no particular limitation to the chemical structure of the matrix polymer provided that the polymer itself or a gel electrolyte employing the polymer exhibits ion conductivity. The matrix polymer used may be polyether compounds, such as polyethylene oxide or polypropylene oxide, halogen-containing high molecular compounds, such as polytetrafluoroethylene, polyvinylidene fluoride or polyvinylidene chloride, polymethacrylic acid and various esters thereof, high molecular compounds, mainly composed of polyacrylamide, polycarbonate, polysulfone or polyethersulfone, and derivatives, copolymers and mixtures thereof. From the viewpoint of chemical stability and ion conductivity, systems mainly based on polyvinylidene fluoride may preferably be employed.

The gel electrolyte contains an electrolyte salt, a matrix polymer and a non-aqueous solvent as a plasticizer.

Although there is no particular limitation to plasticizer, having the aforementioned sigh-molecular solid electrolyte as the gel electrolyte, it is desirable to use a non-aqueous solvent not liable to undergo a decomposition reaction within the operating potential range of the lithium secondary cell. For example, a non-aqueous solvents, such as ethylene carbonate, propylene carbonate, gamma butyrolactone, acetonitrile, diethylether, diethyl carbonate, dimethylcarbonate, 1,2-dimethyoxyethane, dimethyl sulfoxide, 1,3-dioxolan, methyl sulfonate, 2-methyltetrahydrofuran, tetrahydrofuran, sulforan, 2,4-difluoroanisole or vinylene carbonate, may be used alone or as a mixture.

Figure 3:
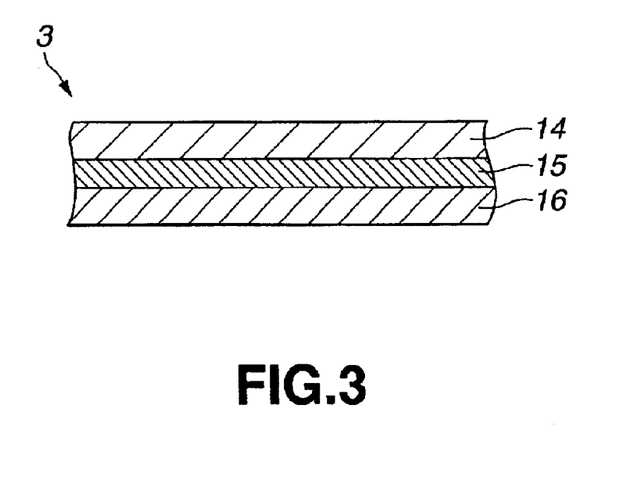
FIG. 3 is a schematic perspective view showing essential portions of am exterior film.

The exterior film 3 is made up of a heat fusion layer 14, having its outer edge heat-sealed to encapsulate the element cell 2 in its inside, a metal layer 15 of, for example, an aluminum foil, and an external layer 16, formed e.g., of an insulating resin, such as nylon, as shown in FIG. 3. Since the exterior film 3 is formed by this sort of the high-molecular multi-layered film, it is able to impart high air tightness and superior mechanical strength to the solid electrolyte cell 1.

The resin film 6 is arranged at a contact portion of the exterior film 3 with the positive electrode lead 4 and the negative electrode lead 5. The provision of the resin film 6 is effective to prevent shorting due to burrs formed on the exterior film 3 to improve contact behavior at a contact area of the exterior film 3 with the positive electrode lead 4 and the negative electrode lead 5.

There is no particular limitation to the type of the material of the resin film 6 if it exhibits adhesion with respect to the positive electrode lead 4 and the negative electrode lead 5. However, it is preferred to use a material composed of polyolefin resins, such as polyethylene, polypropylene, modified polyethylene, modified polypropylene and copolymers thereof. The resin film 6 preferably has a thickness prior to heat fusion in a range from 20 to 30 $\mu$m. If the thickness of the resin film 6 is less than 20 $\mu$m, the resin film is inferior in tractability, whereas, if the film thickness exceeds 300 $\mu$m, the film is permeable to water to render it difficult to maintain air tightness in the cell.

The solid electrolyte cell 1 of the present embodiment, described above, is prepared in the following manner:

First, the positive electrode 12 is prepared. A positive electrode mixture, containing a positive electrode active material and a binder, is evenly coated on a metal foil, such as an aluminum foil, acting as a positive electrode current collector 10, and is dried in situ to form a layer of the positive electrode active material 11 to complete a positive electrode sheet. As the binder for the positive electrode mixture, any suitable known binder may be used. Moreover, any suitable known additive may be added to the positive electrode mixture. The positive electrode sheet then is sliced to a preset shape and a positive electrode lead 4 of e.g., aluminum is welded to a portion of the sliced positive electrode sheet not carrying the layer of the positive electrode active material 11 to complete the positive electrode 12.

Next, the negative electrode 9 is prepared. A negative electrode mixture, containing a negative electrode active material and a binder, is evenly coated on a metal foil, such as a copper foil, acting as a negative electrode current collector 7, and is dried in situ to form a layer of the negative electrode active material 8 to complete a negative electrode sheet. As the binder for the negative electrode mixture, any suitable known binder may be used. Moreover, any suitable known additive may be added to the negative electrode mixture. The negative electrode sheet then is sliced to a preset shape and a negative electrode lead 5 of e.g., aluminum is welded to a portion of the negative electrode current collector 7 not carrying the layer of the negative electrode active material 8 to complete the negative electrode 12.

Figure 4:
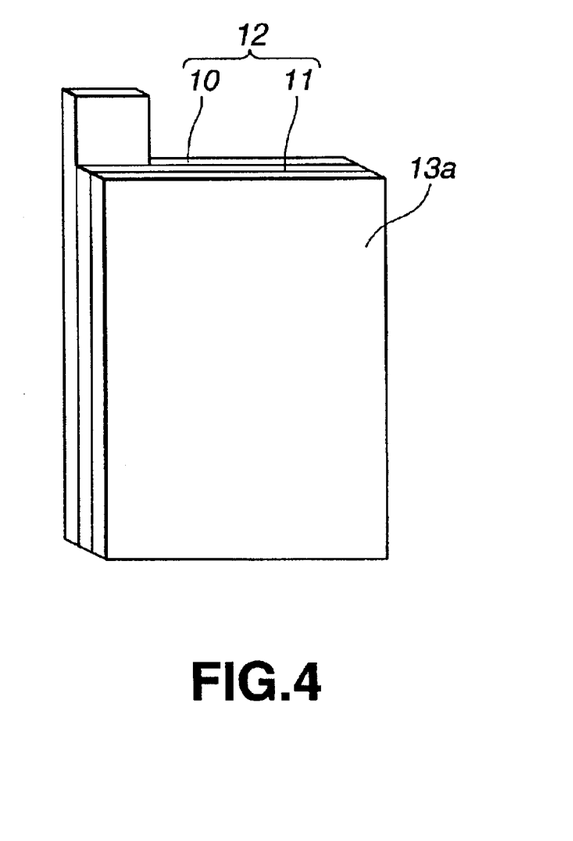
FIG. 4 is a perspective view showing a positive electrode carrying a first solid electrolyte layer.

Next, the first solid electrolyte layer 13a is formed on the layer of the positive electrode active material 11, as shown in FIG. 4. If a gel electrolyte is used as the solid electrolyte layer 13, an electrolyte salt is dissolved in the non-aqueous solvent to prepare a plasticizer. Into this plasticizer is mixed a diene compound. It is preferred to have not less than 75% of the total content of the diene compound mixed at this time. A matrix polymer then is added to the plasticizer containing the diene compound. The resulting mass is stirred sufficiently to dissolve the matrix polymer to prepare a sol-like electrolyte solution. A pre-set amount of this electrolyte solution then is coated on the layer of the positive electrode active material 11. The resulting mass then is allowed to cool at room temperature to permit the matrix polymer to be gelated to form the first solid electrolyte layer 13a formed of the gel electrolyte on the layer of the positive electrode active material 11.

The aforementioned electrolyte solution is preferably coated so that the thickness of the first solid electrolyte layer 13a will be not larger than 10 $\mu$m. By preparing the electrolyte solution containing not less than 75% of the total content of the diene compound, and by coating this electrolyte solution so that the thickness of the first solid electrolyte layer 13a will be not thicker than 10 $\mu$m, an optimum amount of the diene compound may be placed in the vicinity of the positive electrode 12.

Figure 5:
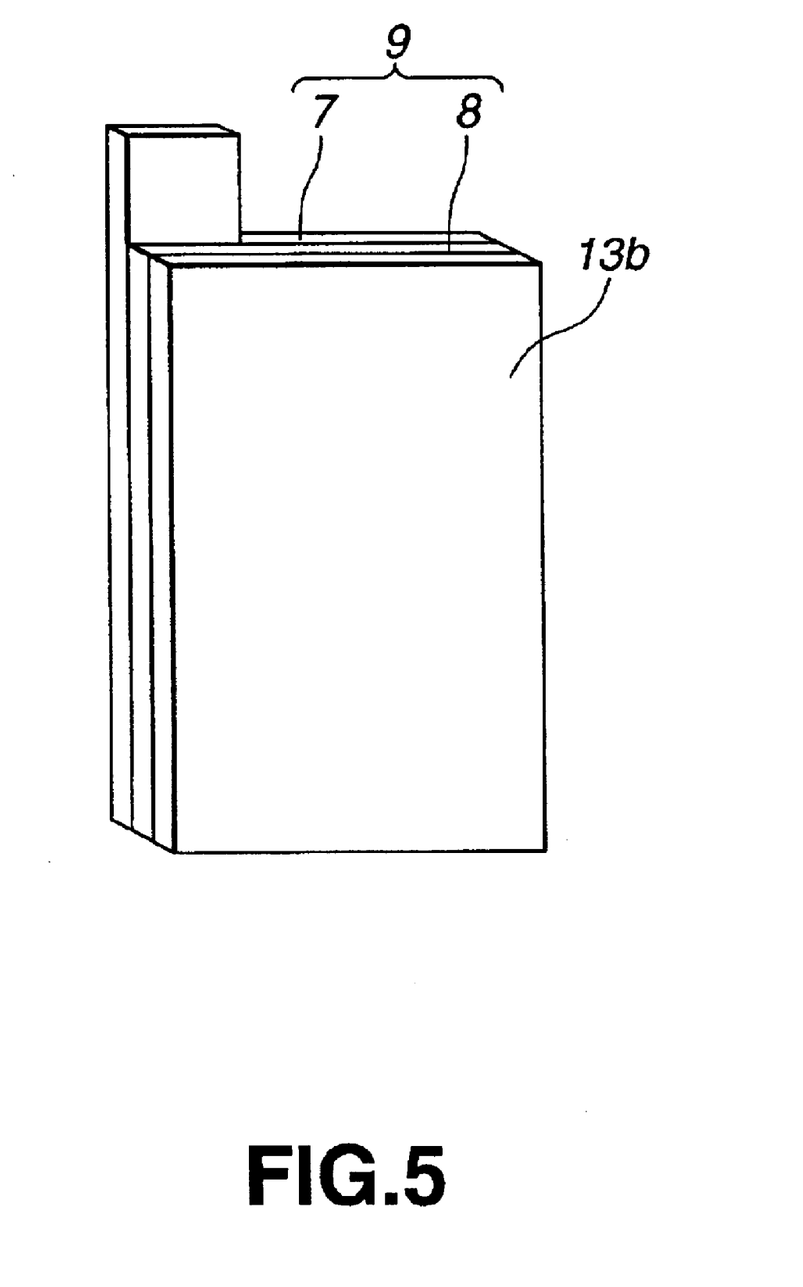
FIG. 5 is a perspective view showing a negative electrode carrying a second solid electrolyte layer.

The second solid electrolyte layer 13b then is formed on the layer of the negative electrode active material 8, as shown in FIG. 5. First, an electrolyte salt is dissolved in a non-aqueous solvent to prepare a plasticizer. Into this plasticizer is added the remaining portion of the diene compound added in forming the first solid electrolyte layer 13a. A matrix polymer then is added to the plasticizer now containing the diene compound and stirred thoroughly to prepare a sol-like electrolyte solution, which solution is then coated in a pre-set amount on the layer of the negative electrode active material 8. The resulting mass then is allowed to cool at room temperature to gelate the matrix polymer to form the second solid electrolyte layer 13b of the gel electrolyte on the layer of the negative electrode active material 8.

The positive electrode 12 and the negative electrode 9, thus prepared, are bonded together so that the first solid electrolyte layer 13a and the second solid electrolyte layer 13b face each other. The resulting mass is then pressed together to an element cell 2.

Finally, this element cell 2 is sandwiched by the exterior film 3 and resin films 6 are placed at the overlapping portions of the positive and negative electrode leads 4, 50 and the exterior film 3. The outer edges of the exterior film 3 are sealed and the positive and negative electrode leads 4, 5 are held by the sealing portions of the positive and negative electrode leads 4, 5 and the exterior film 3, while the element cell 2 is hermetically sealed within the exterior film 3. The element cell 2, thus packed by the exterior film 3, is then heat-treated to complete the solid electrolyte cell 1, The se cell 1, as described above, contains the diene compound having the function of capturing the active oxygen generated in the cell. Thus, it is possible to prevent oxidative decomposition of the electrolyte component to maintain superior cell characteristics.

Figure 6:
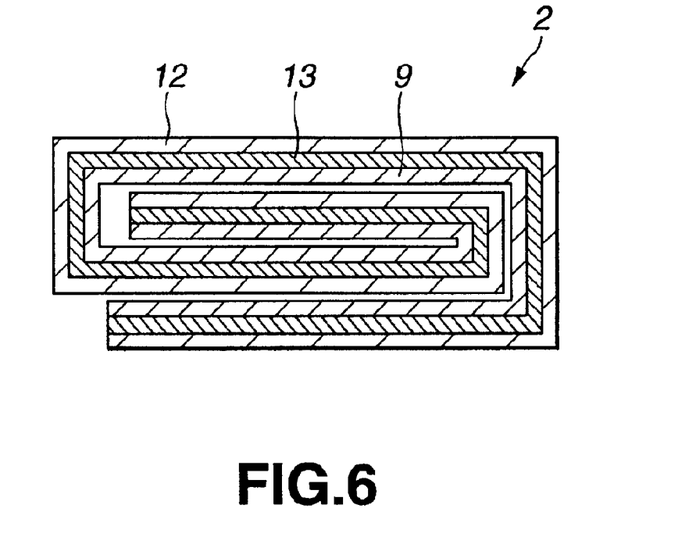
FIG. 6 is a cross-sectional view showing another illustrative structure of an element cell.
Figure 7:
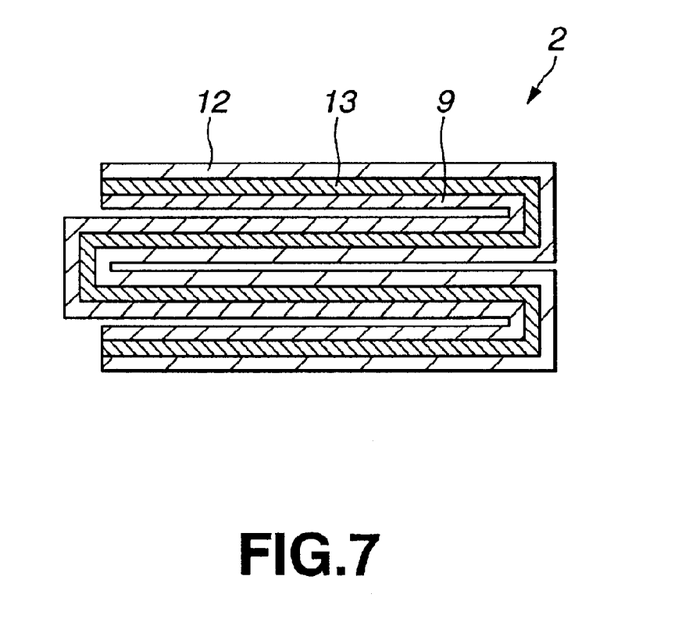
FIG. 7 is a cross-sectional view showing another illustrative structure of an element cell.

In the above-described embodiment, the element cell comprising the positive electrode 12 and the negative electrode 9 layered together is hermetically sealed in the exterior film. The present invention, however, is not limited to this illustrative structure. For example, the present invention can be applied to a configuration in which strip-shaped positive and negative electrodes 12, 9 are layered together with the solid electrolyte layer 13 in-between and the resulting product is wrapped in a coil to form the element cell 2, as shown for example in FIG. 6. The present invention may also be applied to a configuration in which strip-shaped positive and negative electrodes 12, 9 are layered together with the solid electrolyte layer 13 in-between and collapsed alternately to form the element cell 2, as shown for example in FIG. 7.

Meanwhile, if an electrolyte having only low properties asa diaphragm is used as the solid electrolyte layer, a separator may be provided between the positive and negative electrodes to prevent physical contact of the electrodes. The separator used may be of a porous polyolefin or a non-woven cloth.

The solid electrolyte cells of the above-described embodiment may be of a cylindrical, square or coin shape, without limitation to specific shape, while it may also be of a thin type or a large size. Moreover, the present invention can be applied both to a primary cell and a secondary cell.

EXAMPLES

The present invention will now be explained with reference to specified Examples, based on experimental results.

<Sample 1>

First, a negative electrode was prepared as follows:

90 parts by weight of pulverized graphite and 10 parts by weight of poly(vinylidene fluoride-co-hexafluoropropylene) were mixed together to prepare a negative electrode mixture, which then was dispersed and slurried in N-methyl-2-pyrolidone. The slurried negative electrode mixture, thus obtained, is evenly coated on a copper foil, 10 μm in thickness, as a negative electrode current collector. The resulting product was dried and compression-molded in a roll press to form a negative electrode.

A positive electrode then was prepared.

For producing the positive electrode active material ($LiCoO_2$), lithium carbonate and cobalt carbonate were mixed together at a ratio of 0.5 mol to 1 mol and fired in air at 900° C. for five hours. 91 parts by weight of $LiCoO_2$, thus obtained, 6 parts by weight of graphite, as an electrifying agent, and 10 parts by weight of poly(vinylidene fluoride-co-hexafluoropropylene) were mixed together to form a positive electrode mixture, which then was dispersed in N-methyl-2-pyrolidone to form a slurry. The slurried positive electrode mixture, thus obtained, was evenly coated on a strip-shaped aluminum foil, 20 μm in thickness, as a positive electrode mixture. The resulting mass was dried and compression-molded in a roll press to form a positive electrode. The density of the active material per unit area of the positive electrode was 40 mg/cm$^2$.

A gel electrolyte then was produced.

A solution obtained on mixing and dissolving 30 parts by weight of a plasticizer, composed of 31 parts by weight of ethylene carbonate, 41 parts by weight of propylene (carbonate, 10 parts by weight of gamma butyrolactone, 15 parts by weight of $LiPF_6$ and 3 parts by weight of 1,4-cyclohexadiene, 10 parts by weight of poly(vinylidene fluoride-co-hexafluoropropylene) and 60 parts by weight of diethyl carbonate, was evenly coated on and impregnated in the negative and positive electrodes, and allowed to stand at room temperature for eight hours to produce a gel electrolyte after vaporizing off diethyl carbonate.

The negative and positive electrodes, coated with the gel electrolyte, were pressed together with the gel electrolyte sides facing each other to form an element cell in the form of a flat plate 0.4 cm in thickness. The so-obtained element cell was packed in vacuo with a laminated film of a three-layered structure of polypropylene, aluminum and nylon to prepare a cell.

Meanwhile, the amount of 1,4-cyclohexadiene in the gel electrolyte per 1 g of the positive electrode active material in the so-produced cell was 36 mg (0.00045 mol).

<Sample 2>

A cell was prepared in the same way as the sample 1 except setting the composition of the plasticizer used in preparing the gel electrolyte to 27 parts by weight of ethylene carbonate, 36 parts by weight of propylene carbonate, 9 parts by weight of gamma butyrolactone, 15 parts by weight of LiPF6 and to 13 parts by weight of 1,4-cyclohexadiene.

Meanwhile, the amount of 1,4-cyclohexadiene in the gel electrolyte per 1 g of the positive electrode active material in the so-produced cell was 12 mg (0.00015 mol).

<Sample 3>

A cell was prepared in the same way as the sample 1 except using 3 parts by weight of 1,5-cyclohexadiene instead of 3 parts by weight of 1,4-cyclohexadiene in the composition of the plasticizer used in preparing the gel electrolyte.

The amount of 1,5-cyclooctadiene in the gel electrolyte per 1 g of the positive electrode active material in the cell produced was 36 mg (0.00033 mol).

<Sample 4>

First, negative and positive electrodes were prepared in the same way as in the sample 1.

A solution obtained on mixing and dissolving 30 parts by weight of a plasticizer, composed of 32.2 parts by weight of ethylene carbonate, 42.2 parts by weight of propylene carbonate, 10 parts by weight of gamma butyrolactone, 15 parts by weight of LiPF$_6$ and 0.6 part by weight of 1,4-cyclohexadiene, 10 parts by weight of poly(vinylidene fluoride-co-hexafluoropropylene) and 60 parts by weight of diethyl carbonate, was evenly coated on and impregnated in the positive electrode, and allowed to stand at room temperature for eight hours to produce a gel electrolyte after vaporizing off diethyl carbonate.

A solution obtained on mixing and dissolving 30 parts by weight of a plasticizer, composed of 31.3 parts by weight of ethylene carbonate, 41.3 parts by weight of propylene carbonate, 10 parts by weight of gamma butyrolactone, 15 parts by weight of LiPF$_6$ and 2.4 part by weight of 1,4-cyclohexadiene, 10 parts by weight of poly(vinylidene fluoride-co-hexafluoropropylene) and 60 parts by weight of diethyl carbonate, was evenly coated on and impregnated in the positive electrode, and allowed to stand at room temperature for eight hours to produce a gel electrolyte after vaporizing off diethyl carbonate.

The negative and positive electrodes, coated with the gel electrolyte, were pressed together with the gel electrolyte sides facing each other to form a cell as the sample 1.

The amount of 1,4-cyclohexadiene in the gel electrolyte per 1 g of the positive electrode active material in the cell produced was 36 mg (0.00045 mol). In the gel electrolyte formed on the side positive electrode was contained approximately 80% of the total amount added of the 1,4-cyclohexadiene.

<Sample 5>

A cell was prepared in the same way as the sample 1 except setting the composition of the plasticizer used in preparing the gel electrolyte to 42.5 parts by weight of ethylene carbonate, 42.5 parts by weight of propylene carbonate and 15 parts by weight of LiPF$_6$, with 1,4-cyclohexadiene not being used.

<Sample 6>

A cell was prepared in the same way as the sample 1 except setting the composition of the plasticizer used in preparing the gel electrolyte to 27 parts by weight of ethylene carbonate, 36 parts by weight of propylene carbonate, 9 parts by weight of gamma butyrolactone, 15 parts by weight of LiPF6 and to 13 parts by weight of 1,4-cyclohexadiene.

The amount of 1,4-cyclohexadiene in the gel electrolyte per 1 g of the positive electrode active material in the cell produced was 150 mg (0.00188 mol).

<Sample 7>

A cell was prepared in the same way as sample 4 except forming the gel electrolyte on the positive electrode instead of on the negative electrode as in the sample 4, and also except forming the gel electrolyte on the negative electrode instead of on the positive electrode as in the sample 4.

Meanwhile, approximately 20% of the total content of the 1,4-cyclohexadiene added was contained in the gel electrolyte formed on the positive electrode.

The cell prepared as described above was charged at 100 mA constant current/4.2V constant voltage, by way of initial charging, and the initial discharging capacity thereof was measured at 100 mA and 3V. The cell then was subjected to 500 cycles of 250 mA constant current charging/discharging, by way of a charging/discharging test, and the measurement was conducted of the volume upkeep ratio after 300 cycles and 500 cycles. The state of gas evolution during the charging/discharging cycle test was evaluated by visual check. As for the state of the gas evolution, gas evolution was judged not to have occurred if no gas was evolved, while gas evolution was judged to have occurred if gas was evolved and the laminate film was expanded to impair the cell appearance. The results are shown in Table 1.

|  | initial capacity | volume upkeep ratio (%) | | |
| --- | --- | --- | --- | --- |
|  | (mAh) | after 300 cycles | after 500 cycles | gas evolution |
| sample 1 | 450 | 94 | 85 | not occurred |
| sample 2 | 450 | 92 | 80 | not occurred |
| sample 3 | 450 | 90 | 78 | not occurred |
| sample 4 | 450 | 95 | 87 | not occurred |
| sample 5 | 450 | 86 | 71 | not occurred |
| sample 6 | 450 | 90 | 80 | occurred |
| sample 7 | 450 | 88 | 79 | not occurred |

As may be seen from the results of Table 1, the samples 1 to 4, containing the diene compound, were of superior volume upkeep ratio, both after 300 cycles and after 500 cycles, as compared to the sample 5 not containing the diene compound.

The samples 1 and 2, superior in the volume upkeep ratio, was free from gas evolution accompanying the charging/discharging cycles. On the other hand, with the sample 6 containing 0.00188 mol of 1,4-cyclohexadiene to 1 g of the positive electrode active material, was satisfactory in the volume upkeep ratio. However, gas evolution was noticed with the progress of the charging/discharging cycles, thus affecting the cell appearance. From this, it could be seen that the content of the diene compound per 1 g of the positive electrode active material is preferably in a range from 0.0001 mol to 0.0005 mol.

From the comparison of the samples 1 and 3, it has also been seen that use of 1,4-cyclohexadiene, among the diene compounds, is particularly effective in improving the charging/discharging cycles.

It has also been seen that the sample 4, in which 80% of the total content of 1,4-cyclohexadiene is contained in the positive electrode side gel electrolyte, shows particularly high charging/discharging characteristics as compared to the sample 7 in which the relative amounts of 1,4-cyclohexadiene in the positive electrode side and in the negative electrode side are reversed from those of the sample 4.

What is claimed is:

1. A solid electrolyte cell comprising:
   a positive electrode having a positive electrode current collector and a positive electrode active material;
   a negative electrode having a negative electrode current collector and a negative electrode active material; and
   a solid electrolyte comprising at least two layers, namely a first solid electrolyte layer and a second solid electrolyte layer wherein
      a diene compound contained in the first solid electrolyte layer is not less than 75% of the total content thereof.

2. The solid electrolyte cell according to claim 1 wherein said diene compound is 1,4-cyclohexadiene.

3. The solid electrolyte cell according to claim 1 wherein said solid electrolyte contains a non-aqueous solvent.

4. The solid electrolyte cell according to claim 3 wherein said non-aqueous solvent is selected from the group consisting of ethylene carbonate, propylene carbonate, gamma-butyrolactone, acetonitrile, diethylether, diethylene carbonate, dimethyl carbonate, 1,2-dimethoxyethane, dimethyl sulfoxide, 1,3-dioxolan, methyl sulfonate, 2-methyltetrahydrofuran, tetrahydrofuran, sulforan, 2,4-difluoroanisole and vinylene carbonate.

5. The solid electrolyte cell according to claim 1 wherein said positive and negative electrodes are layered and coiled together with interposition of said electrolyte.

6. The solid electrolyte cell according to claim 1 wherein said positive and negative electrodes are layered and stacked together with interposition of said electrolyte.

7. The solid electrolyte cell according to claim 1 wherein a separator is arranged between said positive and negative electrodes.

8. A solid electrolyte cell according to claim 1, wherein said solid electrolyte comprises an electrolyte salt dispersed in a matrix polymer and is arranged between said positive electrode and the negative electrode.

9. The solid electrolyte cell according to claim 8 wherein said matrix polymer selected from the group consisting of polyethylene oxide, polypropylene oxide, polytetrafluoroethylene, polyvinylidene fluoride, polyvinylidene chloride, polymethacrylic acid, polyacrylic amide, polycarbonate, polysulfone and polyethersulfone.

10. The solid electrolyte cell according to claim 8 wherein said electrolyte salt is selected from the group consisting of $LiPF_6$, $LiClO_4$, $LiCF_3SO_3$, $LiCF_3SO_3$, $LiAsF_6$, $LiN(CF_3SO_3)_2$, $C_4F_9SO_3Li$, $LiC(CF_3SO_2)_3$, LiF, and LiBr.

* * * * *